US010299042B2

(12) United States Patent
Dusse et al.

(10) Patent No.: US 10,299,042 B2
(45) Date of Patent: *May 21, 2019

(54) METHOD AND APPARATUS FOR CONTROLLING PORTABLE AUDIO DEVICES

(71) Applicant: Logitech Europe S.A., Lausanne (CH)

(72) Inventors: Stephen Dusse, Redwood City, CA (US); Doug Ebert, Portland, OR (US); Dudley Guy Kiang Wong, Sunnyvale, CA (US); Biqing (Becky) Wu, Vancouver, WA (US); Jon Albert Howell, Santa Cruz, CA (US); Kelly Lane, Los Altos, CA (US)

(73) Assignee: Logitech Europe, S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,418

(22) Filed: Feb. 21, 2018

(65) Prior Publication Data

US 2018/0184206 A1 Jun. 28, 2018

Related U.S. Application Data

(62) Division of application No. 14/276,985, filed on May 13, 2014, now Pat. No. 9,942,661.

(60) Provisional application No. 61/823,141, filed on May 14, 2013.

(51) Int. Cl.
*G06F 17/00* (2019.01)
*H04R 5/04* (2006.01)

(52) U.S. Cl.
CPC .......... *H04R 5/04* (2013.01); *H04R 2420/07* (2013.01)

(58) Field of Classification Search
CPC ........ H04R 5/00; H04R 5/04; H04R 2420/00; H04R 2420/07
USPC ............ 700/94; 455/73; 370/338; 379/88.12
See application file for complete search history.

(56) References Cited

U.S. PATENT DOCUMENTS

| | | | | |
|---|---|---|---|---|
| 5,946,343 | A | 8/1999 | Schotz et al. | |
| 6,608,907 | B1 | 8/2003 | Lee | |
| 7,295,809 | B2 | 11/2007 | Moore | |
| 7,483,538 | B2 | 1/2009 | McCarty et al. | |
| 8,005,473 | B2 | 8/2011 | Zeinstra et al. | |
| 2005/0289224 | A1 | 12/2005 | Deslippe et al. | |
| 2006/0009985 | A1 | 1/2006 | Ko et al. | |
| 2007/0223725 | A1 | 9/2007 | Neumann et al. | |
| 2008/0089268 | A1 | 4/2008 | Kinder et al. | |
| 2008/0247554 | A1 | 10/2008 | Caffrey | |
| 2009/0298420 | A1 | 12/2009 | Haartsen et al. | |
| 2010/0178870 | A1 | 7/2010 | Choi | |
| 2010/0284389 | A1 | 11/2010 | Ramsay et al. | |
| 2011/0129048 | A1 | 6/2011 | Barbe et al. | |
| 2011/0136442 | A1* | 6/2011 | Beals | H04L 63/0853 455/73 |

(Continued)

*Primary Examiner* — Md S Elahee
(74) *Attorney, Agent, or Firm* — Patterson & Sheridan, LLP

(57) ABSTRACT

Embodiments of the disclosure may provide an apparatus and method of controlling and altering the acoustic output of audio devices that are used in conjunction with a computing device. In some embodiments, the apparatus and methods include a wireless speaker communication method and computing device software application that are configured to work together to more easily setup and deliver audio information from an audio source to one or more portable audio speakers.

21 Claims, 7 Drawing Sheets

(56) References Cited

U.S. PATENT DOCUMENTS

| | | | |
|---|---|---|---|
| 2014/0003625 | A1 | 1/2014 | Sheen et al. |
| 2014/0277642 | A1 | 9/2014 | Anderson et al. |
| 2014/0277646 | A1 | 9/2014 | Anderson et al. |

* cited by examiner

METHOD AND APPARATUS FOR CONTROLLING PORTABLE AUDIO DEVICES

CROSS-REFERENCE TO RELATED APPLICATIONS

This application is a divisional of co-pending U.S. patent application Ser. No. 14/276,985, filed May 13, 2014, which claims benefit of U.S. Provisional Application Ser. No. 61/823,141, filed May 14, 2013 which are both incorporated by reference in its entirety.

BACKGROUND OF THE INVENTION

Field of the Invention

The present invention generally relates to audio devices and, more specifically, to a technique for controlling and altering the user's experience and/or acoustic output of audio devices that are used in conjunction with each other.

Description of the Related Art

The popularity of portable music players has increased dramatically in the past decade. Modern portable music players allow music enthusiasts to listen to music in a wide variety of different environments without requiring access to a wired power source. For example, a battery-operated portable music player such as an iPod® is capable of playing music in a wide variety of locations without needing to be plugged in. Conventional portable music players are typically designed to have a small form factor in order to increase portability. Accordingly, the batteries within such music players are usually small and only provide several hours of battery life. Similarly, the speakers within such music players are typically small and mono-aural, and usually designed to consume minimal battery power in order to extend that battery life.

As a result, the speakers within conventional portable music players often times have a dynamic range covering only a fraction of the frequency spectrum associated with most modern music. For example, modern music often includes a wide range of bass frequencies. However, the speakers within a conventional portable music player usually cannot play all of the bass frequencies due to physical limitations of the speakers themselves, or because doing so would quickly drain the batteries within the music player.

To improve a user's audio experience it is often desirable to link two or more portable speakers and an audio source, such as a music player, together to provide a richer and enveloping audio experience. Due to limitations in standard wireless communication protocols it is a non-trivial task to setup and control the playback of audio delivered from an audio source, such as a computing device (e.g., music player), which may include an iPod®, iPhone®, iPad®, Android™ phone, Samsung phone, Samsung Galaxy®, Squeeze™ box, or other similar audio delivery enabled computing device. Therefore, there is need for a wireless speaker, wireless speaker communication method and computing device software application, which are all able to work together and be easily setup and used to deliver audio from the audio source to a plurality of portable audio speakers.

Moreover, the user's listening experience is often controlled by the environment in which the audio information is delivered from the portable speakers. For example, a user's experience will be different if the playback of the audio is made in a small room versus an outdoor location. Therefore, there is a need for a wireless speaker and control method that allow a user to seamlessly configure and control the audio delivered from two or more speakers based on the speaker type and environment in which the speakers are positioned.

As the foregoing illustrates, what is needed in the art is an improved wireless speaker system and audio controlling elements that are able to provide an improved sound quality, an extended battery life and improved controlling method.

SUMMARY

Embodiments of the disclosure may provide an apparatus and method of controlling and altering the acoustic output of audio devices that are used in conjunction with a computing device. The apparatus and methods disclosed herein may include a wireless speaker communication method and computing device software application that are configured to work together to more easily setup and deliver audio information from an audio source to one or more portable audio speakers.

Embodiments of the disclosure may further provide a method for generating an acoustic output from an audio device, comprising receiving, at a first audio device, device specifications associated with a second audio device via a first communication link formed between the first audio device and the second audio device, sending audio data to the second audio device from the first audio device, wherein the sent audio data is derived from audio data received from a supervising audio device via a second communication link formed between the first audio device and the supervising audio device, and generating a first acoustic output from the first audio device using the audio data received from the supervising audio device and a second acoustic output from the second audio device using the sent audio data.

Embodiments of the disclosure may further provide a method for generating an acoustic output from an audio device, comprising receiving, at a supervising audio device, device specifications associated with a first audio device via a first communication link formed between the first audio device and the supervising audio device, displaying at least one physical attribute of the first audio device on an image displaying device coupled to the supervising audio device based on the received device specifications, sending audio data to the first audio device from the supervising audio device via the first communication link, and generating a first acoustic output from the first audio device using the audio data received from the supervising audio device. The method may further comprise receiving, at the supervising audio device, device specifications associated with a second audio device via a second communication link formed between the second audio device and the supervising audio device, displaying at least one physical attribute of the second audio device on the image displaying device coupled to the supervising audio device based on the device specifications received from the second audio device, and generating a second acoustic output from the second audio device using audio data received from the supervising audio device. The method of generating the second acoustic output may further comprise sending the audio data to the first audio device from the supervising audio device via the first communication link, and then sending the audio data to the second audio device from the first audio device via the second communication link. The method of generating the second acoustic output may also further comprise sending the audio data to the second audio device from the supervising audio device via the second communication link.

Embodiments of the disclosure may provide a method for generating an acoustic output from an audio device, comprising forming a communication link between a first audio device and a second audio device, forming a communication link between the first audio device and a third audio device, retrieving device specifications associated with the second and the third audio devices, and displaying at least one physical attribute of the second audio device and/or the third audio device on an image displaying device coupled to the first audio device. The displayed image being based on the retrieved device specification for the second audio device or the third audio device. The method also includes transferring audio data to the second audio device from the first audio device, generating a first acoustic output from the second audio device based on the transferred audio data, and generating a second acoustic output from the third audio device based on the transferred audio data.

Embodiments of the disclosure may provide a method for generating an acoustic output from an audio device, comprising forming a communication link between a first audio device and a second audio device, forming a communication link between the first audio device and a third audio device, transferring audio data to the second audio device from the first audio device, wherein the audio data comprises left channel data and right channel data, and simultaneously generating a first acoustic output from the second audio device and a second acoustic output from the third audio device, wherein the first acoustic output includes the left channel data and the second acoustic output includes the right channel data, and the first acoustic output and the second acoustic output are different. The method also includes transmitting a command to the second audio device, and then simultaneously generating a third acoustic output from the second audio device and a fourth acoustic output from the third audio device, wherein the third acoustic output comprises the right channel data and the fourth acoustic output comprises the left channel data, and the third acoustic output and the fourth acoustic output are different. The computer-implemented method may also include generating the second acoustic output and generating the fourth acoustic output by transferring the audio data to the third audio device from the second audio device, wherein the audio data is transferred to the third audio device from the second audio device via a communication link formed between the second and third audio devices.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
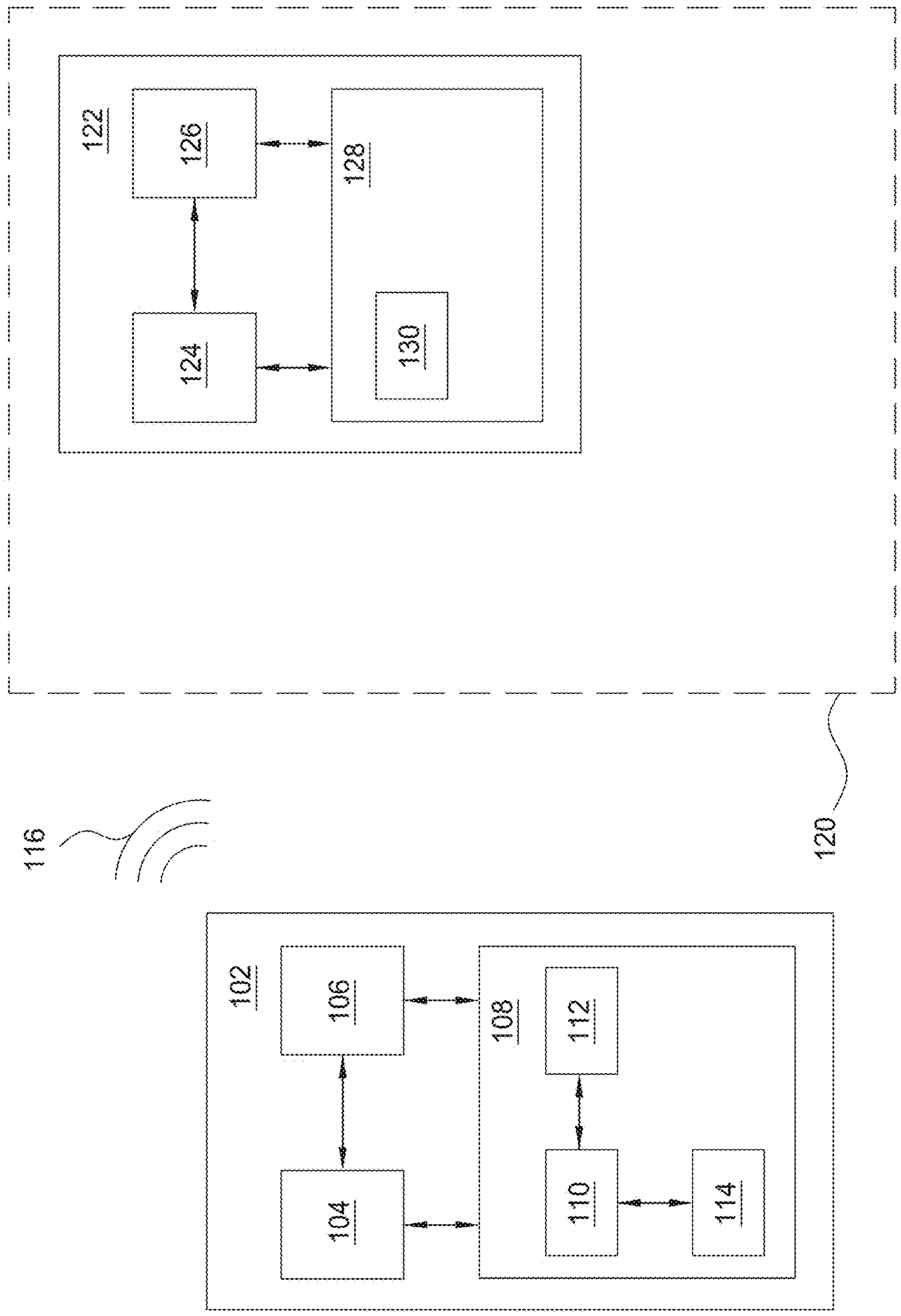
FIG. 1 is a conceptual diagram that illustrates a supervising audio device and an auxiliary audio device, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the present disclosure. However, it will be apparent to one of skill in the art that the present disclosure may be practiced without one or more of these specific details. In other instances, well-known features have not been described in order to avoid obscuring the present disclosure.

Figure 2A:
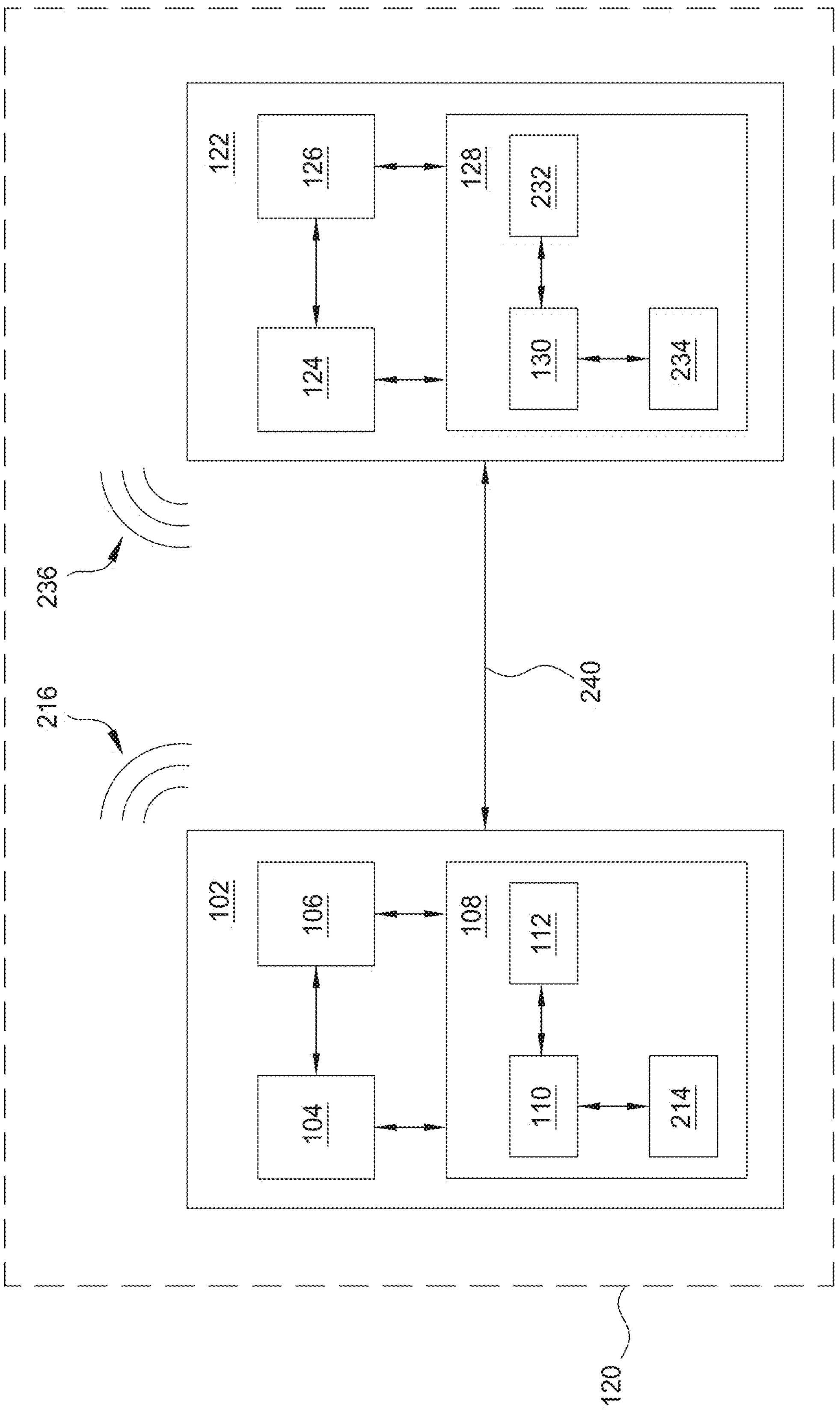
FIG. 2A is a conceptual diagram that illustrates the supervising audio device and auxiliary audio device of FIG. 1 coupled together via a communication link, according to one embodiment of the present disclosure.
Figure 2B:
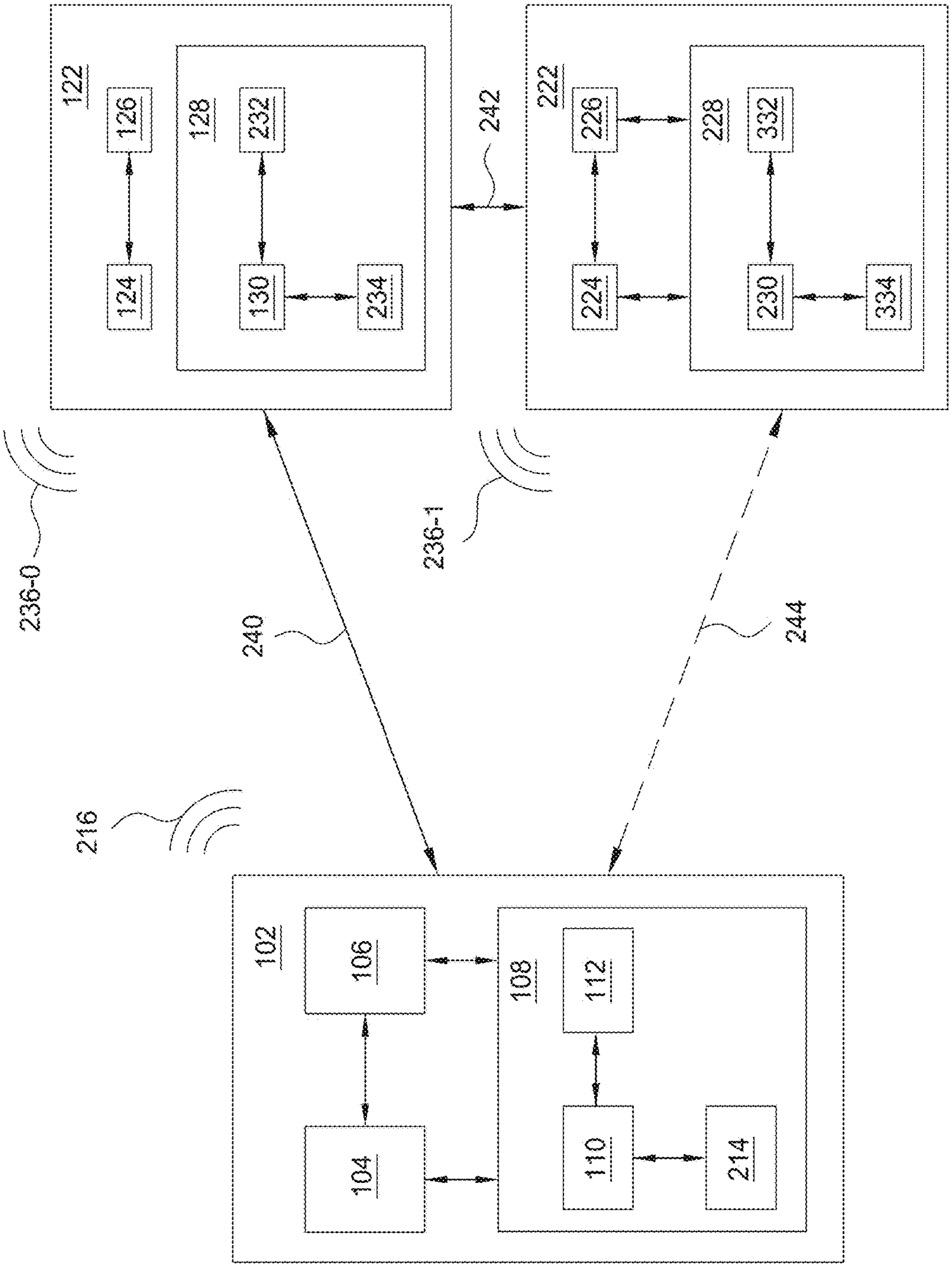
FIG. 2B is a conceptual diagram that illustrates the supervising audio device, the auxiliary audio device of FIG. 1, and another auxiliary audio device configured to generate acoustic output in conjunction with one another, according to one embodiment of the present disclosure.

Embodiments of the disclosure may provide an apparatus and method of controlling and altering the acoustic output of audio devices that are used in conjunction with a computing device. In some embodiments, the apparatus and methods include a wireless speaker communication method and computing device software application that are configured to work together to more easily setup and deliver audio information from an audio source to one or more portable audio speakers. FIGS. 1 and 2A illustrate a configuration in which a single auxiliary computing device 122, such as a portable wireless speaker, is used in conjunction with an audio source, such as a supervising audio device 102, which is some times referred to herein as a supervising device 102. While the supervising audio device 102, which is discussed further below, may include audio playback capability and/or may be relatively easily transported (e.g., portable), these configurations are not intended to be limiting as to the scope of the disclosure described herein, and thus may generally include any type of computing device, such as a cell phone (e.g., smart phone), a digital music player, a tablet computer, a laptop or other similar device. However, in some embodiments, to improve a user's audio experience it is desirable to link two or more portable speakers and an audio source together to provide a richer and enveloping audio experience. FIG. 2B illustrate a configuration in which a two or more auxiliary computing devices 122, such as two portable wireless speakers, are used in conjunction with an audio source, such as a supervising audio device 102.

Single Auxiliary Computing Device

FIG. 1 is a conceptual diagram that illustrates a supervising audio device 102. As shown, supervising audio device 102 is configured to generate an acoustic output 116 and resides adjacent to a boundary 120 that includes an auxiliary computing device 122.

Supervising audio device 102 may be any technically feasible computing device configured to generate an acoustic output. In practice, supervising audio device 102 may be battery-operated, although wired supervising audio devices also fall within the scope of the present disclosure. In one example, as noted above, the supervising audio device 102 may be a cell phone (e.g., smart phone), a digital music player, a tablet computer, a laptop, a personal computer or other similar device.

Supervising audio device 102 includes a processing unit 104 coupled to input/output (I/O) devices 106 and to a memory unit 108. Memory unit 108 includes a software application 110, audio data 112, and a primary device profile 114. Processing unit 104 may be any hardware unit or combination of hardware units capable of executing software applications and processing data, including, e.g., audio data. For example, processing unit 104 could be a central processing unit (CPU), a digital signal processor (DSP), an application-specific integrated circuit (ASIC), a combination of such units, and so forth. Processing unit 104 is configured to execute software application 110, process audio data 112, and access primary device profile 114, each included within memory unit 108, as discussed in greater detail below.

I/O devices 106 are also coupled to memory unit 108 and may include devices capable of receiving input and/or devices capable of providing output. For example, I/O devices 106 could include one or more speakers configured to generate an acoustic output. Alternatively, I/O devices 106 could include one or more audio ports configured to output an audio signal to an external speaker coupled to the audio ports and configured to generate an acoustic output based on that audio signal. The I/O devices 106 may also include components that are configured to display information to the user (e.g., LCD display, OLED display) and receive input from the user. I/O devices 106 may also include one or more transceivers configured to establish one or more different types of wireless communication links with other transceivers residing within other computing devices. A given transceiver within I/O devices 106 could establish, for example, a Wi-Fi communication link, a Bluetooth® communication link or near field communication (NFC) link, among other types of communication links.

Memory unit 108 may be any technically feasible type of hardware unit configured to store data. For example, memory unit 108 could be a hard disk, a random access memory (RAM) module, a flash memory unit, or a combination of different hardware units configured to store data. Software application 110 within memory unit 108 includes program code that may be executed by processing unit 104 in order to perform various functionalities associated with supervising audio device 102. Those functionalities may include configuring supervising audio device 102 based on primary device profile 114, and generating audio signals based on audio data 112 and/or primary device profile 114, as described in greater detail herein and below in conjunction with FIG. 2A.

Audio data 112 may be any type of data that represents an acoustic signal, or any type of data from which an acoustic signal may be derived. For example, audio data 112 could be an N-bit audio sample, at least a portion of an mp3 file, a WAV file, a waveform, and so forth. In one embodiment, audio data 112 is derived from a cloud-based source, such as Pandora® Internet Radio. As mentioned above, software application 110 may generate audio signals based on audio data 112. Supervising audio device 102 may then generate an acoustic output, such as, e.g., primary acoustic output 116, based on those audio signals.

Primary device profile 114 may reflect various settings and/or parameters associated with the acoustic output of supervising audio device 102. For example, primary device profile 114 could include equalization settings, volume settings, sound modulation settings, a low-frequency cutoff parameter, a crossover cutoff parameter, and so forth. As mentioned above, software application 110 may configure supervising audio device 102 based on primary device profile 114. Supervising audio device 102 may then generate an acoustic output, such as, e.g., primary acoustic output 116, based on audio data 112 and based on primary device profile 114, as also mentioned above.

In FIG. 1, supervising audio device 102 resides adjacent to boundary 120 that includes an auxiliary audio device 122, as previously mentioned. Boundary 120 may represent any physical or virtual construct that distinguishes one region of physical space from another region of physical space. For example, boundary 120 could be a wall that separates one room of a residence from another room of that residence. Alternatively, boundary 120 could be a virtual threshold represented by data that includes real-world coordinates corresponding to a physical location. In FIG. 1, supervising audio device 102 resides external to boundary 120, while auxiliary audio device 122 resides within boundary 120. In one configuration, the boundary 120 is defined by the physical range of the communication link 240 formed between the supervising audio device 102 and the auxiliary audio device 122, which is discussed further below in conjunction with FIG. 2A.

Auxiliary audio device 122 may be any technically feasible computing device configured to generate an acoustic output. For example, auxiliary audio device 122 could be a portable speaker or a collection of speakers, among other such devices. In practice, auxiliary audio device 122 may be a battery-operated wireless audio device, although, wired audio devices also may fall within the scope of the disclosure provided herein. In one embodiment, supervising audio device 102 may be a Bluetooth wireless speaker that is available from Logitech.

Auxiliary audio device 122 includes a processing unit 124 coupled to I/O devices 126 and to a memory unit 128 that includes a software application 130. Processing unit 124 may be any hardware unit or combination of hardware units capable of executing software applications and processing data, including, e.g., audio data. For example, processing unit 124 could be a DSP, CPU, ASIC, a combination of such units, and so forth. In one embodiment, processing unit 124 may be substantially similar to processing unit 104 within supervising audio device 102. Processing unit 124 is configured to execute software application 130, as described in greater detail below.

I/O devices 126 are also coupled to memory unit 128 and may include devices capable of receiving input and/or devices capable of providing output. For example, I/O devices 126 could include one or more speakers and/or one or more audio ports configured to output an audio signal to an external speaker. I/O devices 126 may also include one or more transceivers configured to establish one or more different types of wireless communication links with other transceivers, including, e.g. Wi-Fi communication links or Bluetooth® communication links, near field communication (NFC) links, among others. In one embodiment, I/O devices 126 may be substantially similar to I/O devices 106 within supervising audio device 102. The I/O devices 126 may also include one or more input-output ports (e.g., micro-USB jacks, 3.5 mm jacks, etc.) that are configured to provide power to the auxiliary audio device and/or establish one or more different types of wired communication links with the components in the auxiliary audio device 122, the supervising audio device 102 or other external components.

Memory unit 128 may be any technically feasible type of hardware unit configured to store data, including, e.g., a hard disk, a RAM module, a flash memory unit, or a combination of different hardware units configured to store data. In one embodiment, memory unit 128 is substantially similar to memory unit 108 within supervising audio device 102. Software application 130 within memory unit 128 includes program code that may be executed by processing unit 124 in order to perform various functionalities associated with auxiliary audio device 122. Those functionalities are described in greater detail below in conjunction with FIG. 2A.

FIG. 2A is a conceptual diagram that illustrates the supervising audio device 102 and auxiliary audio device 122 of FIG. 1 coupled together via communication link 240, according to one embodiment of the invention. As shown, supervising audio device 102 and auxiliary audio device 122 both reside within boundary 120. Supervising audio device 102 is configured to generate secondary acoustic output 216, and auxiliary audio device 122 is configured to generate auxiliary acoustic output 236. As also shown, memory unit 108 within supervising audio device 102 includes secondary device profile 214, and memory unit 128 within auxiliary audio device 122 includes audio data 232 and auxiliary device profile 234.

In one embodiment, supervising audio device 102 may determine that supervising audio device 102 and auxiliary audio device 122 both reside within boundary 120 via multiple different methods. For example, the user of supervising audio device 102 could press a button on the auxiliary audio device 122 in order to indicate that supervising audio device 102 and auxiliary audio device 122 both reside within boundary 120. In another example, the user of supervising audio device 102 could press a button on supervising audio device 102 in order to indicate that supervising audio device 102 and auxiliary audio device 122 both reside within boundary 120. Alternatively, the user could perform a gesture that would be measured by accelerometers within supervising audio device 102 or the auxiliary audio device 122 to indicate that supervising audio device 102 and auxiliary audio device 122 both reside within boundary 120 and need to establish a communication link 240. In one configuration, a near field communication technique can be used to indicate that the supervising audio device 102 and auxiliary audio device 122 both reside within boundary 120. Also, during the discovery process, a near field communication technique can be used to transfer device specifications or other related information between the devices. In some configurations, pairing operations formed between the supervising audio device 102 and the auxiliary audio device 122 may be performed using NFC components found in the I/O devices 106 and 126.

Alternately, the supervising audio device 102 is configured to determine when supervising audio device 102 and auxiliary audio device 122 both reside within boundary 120, and, in response, to establish communication link 240. Supervising audio device 102 may implement any technically feasible approach for determining that supervising audio device 102 and auxiliary audio device 122 both reside within boundary 120. In one embodiment, supervising audio device 102 periodically exchanges data signals with auxiliary audio device 122 and generates a received signal strength indication (RSSI) metric by analyzing the strength of signals received from auxiliary audio device 122. Supervising audio device 102 may then determine whether supervising audio device 102 and auxiliary audio device 122 both reside within boundary 120 based on the generated RSSI metric.

In another embodiment of the present invention, supervising audio device 102 may determine that supervising audio device 102 and auxiliary audio device 122 both reside within boundary 120 based on physical communication between the two audio devices. For example, a user of supervising audio device 102 could "tap" supervising audio device 102 on the surface of auxiliary audio device 122. Based on accelerometer readings generated by supervising audio device 102 and/or auxiliary audio device 122 in response to such a "tap," supervising audio device 102 may determine that those two audio devices both reside within boundary 120. Auxiliary audio device 122 may also act as a dock for supervising audio device 102, and supervising audio device 102 may determine that supervising audio device 102 and auxiliary audio device 122 both reside within boundary 120 when supervising audio device 102 is docked to auxiliary audio device 122.

Persons skilled in the art will recognize that a wide variety of techniques may be implement by supervising audio device 102 and/or auxiliary audio device 122 in order to determine that supervising audio device 102 and auxiliary audio device 122 both reside within boundary 120. Likewise, persons skilled in the art will recognize that supervising audio device 102 may implement any of the aforementioned techniques in order to determine that supervising audio device 102 and auxiliary audio device 122 no longer both reside within boundary 120. In one embodiment, auxiliary audio device 122 may perform any of the techniques discussed above relative to supervising audio device 102 in order to determine that supervising audio device 102 and auxiliary audio device 122 both reside within boundary 120 (or, conversely, do not both reside within boundary 120). Further, persons skilled in the art will recognize that the aforementioned approaches are exemplary in nature and not meant to limit to scope of the present invention described herein.

Once supervising audio device 102 determines that supervising audio device 102 and auxiliary audio device 122 both reside within boundary 120, supervising audio device 102 establishes communication link 240 with auxiliary audio device 122, as mentioned above. Communication link 240 may be any technically feasible data pathway capable of transporting data, including, e.g., a Wi-Fi link or a Bluetooth® link, a physical data link, analog link, and so forth. Supervising audio device 102 may establish communication link 240 by performing a manual or automatic pairing procedure with auxiliary audio device 122 or otherwise exchanging communication protocol information.

Supervising audio device 102 may then acquire device specifications (not shown) from auxiliary audio device 122 that reflect the operational capabilities associated with auxiliary audio device 122 and/or physical characteristics of the auxiliary audio device 122. The device specifications associated with auxiliary audio device 122 could represent, for example, firmware type information, physical attributes of the auxiliary audio device 122 (e.g., speaker color scheme, tag color, skin color, microphone is present), equalizer settings (e.g., vocal focused equalizer setting, outdoors equalizer setting, bass-reduced equalizer setting, bass rich equalizer setting), audio settings (e.g., volume level, volume range), language settings (e.g., English, Japanese, etc.) for vocalized notifications, model number, streaming status (e.g., auxiliary audio device is connected with other wireless devices), a battery level information, a dynamic range information, a power output information or a position of speakers, version level information, among others. In one embodiment, the device specifications may indicate a device identifier associated with auxiliary audio device 122, and supervising audio device 102 may be configured to retrieve additional device information associated with auxiliary audio device 122 using that device identifier (e.g., via a cloud-based service). Supervising audio device 102 is configured to analyze those device specifications and to then cause supervising audio device 102 and auxiliary audio device 122 to generate secondary acoustic output 216 and auxiliary acoustic output 236, respectively, in conjunction with one another.

Secondary acoustic output 216 and auxiliary acoustic output 236 may both be derived from audio data 112, however, those acoustic outputs may include different audio information (e.g., audio frequencies, loudness, etc.). In one embodiment, the supervising audio device 102 is configured to analyze the device specifications associated with auxiliary audio device 122 and to determine which frequencies auxiliary audio device 122 is optimally suited to generate relative to supervising audio device 102. Supervising audio device 102 may then cause auxiliary audio device 122 to generate acoustic output 236 having those frequencies for which auxiliary audio device 122 is optimally suited to generate. In configurations in which the supervising audio device 102 is adapted to generate an acoustic output 216, the supervising audio device 102 can then tailor its output such that the delivered acoustic output 216 is optimally suited for the audio generating components in the supervising audio device 102.

Persons skilled in the art will recognize that the approaches described thus far are not limited to audio devices capable of generating acoustic outputs having different frequency ranges, per se. More specifically, supervising audio device 102 may implement the approaches described thus far in order to cause auxiliary audio device 122 to generate auxiliary acoustic output 236 as having generally different sound quality compared to secondary acoustic output 216. For example, supervising audio device 102 could cause auxiliary audio device 122 to generate acoustic output 236 based on different equalization settings than those implemented by supervising audio device 102 when generating acoustic output 216. Alternatively, supervising audio device 102 could cause auxiliary audio device 122 to generate acoustic output 236 based on different volume settings than those implemented by supervising audio device 102 when generating acoustic output 216. In addition, persons skilled in the art will recognize that the techniques described herein are not limited in application to just two audio devices, and that any number of devices may be configured to generate acoustic output in conjunction with one another by implementing the techniques described herein.

Supervising audio device 102 may implement the general approach described above for coordinating the generation of secondary acoustic output 216 and auxiliary acoustic output 236 by implementing a variety of techniques. However, two such techniques, associated with different embodiments of the invention, are described in greater detail below.

In one embodiment, supervising audio device 102 may acquire device specifications associated with auxiliary audio device 122 and then generate secondary device profile 214 and/or auxiliary device profile 234. Supervising audio device 102 may store secondary device profile 214 within memory unit 108, while auxiliary audio device 122 may store auxiliary device profile 234 within memory unit 128, as is shown in FIG. 2A. In one configuration, the supervising audio device 102 transfers the auxiliary device profile 234 to the auxiliary audio device 122 using the communications link 240. Secondary device profile 214 may reflect various settings and/or parameters associated with acoustic output 216 of supervising audio device 102. Likewise, auxiliary device profile 234 may reflect various settings and/or parameters associated with acoustic output 236 of auxiliary audio device 122.

Software application 110 within memory unit 108, when executed by processing unit 104, may configure supervising audio device 102 based on the settings and/or parameters included within secondary device profile 214. Similarly, software application 130 within memory unit 128, when executed by processing unit 124, may configure auxiliary audio device 122 based on the settings and/or parameters included within auxiliary device profile 234. Supervising audio device 102 and auxiliary audio device 122 may then generate secondary acoustic output 216 and auxiliary acoustic output 236, respectively, based on the configurations associated with secondary device profile 214 and auxiliary device profile 234, respectively.

As mentioned above, secondary acoustic output 216 and auxiliary acoustic output 236 may both be derived from audio data 112. Auxiliary audio device 122 may receive audio data 112 from supervising audio device 102 across communication link 240 and store that audio data as audio data 232. The received and stored audio data 232 and auxiliary device profile 234 can then be used by the processing unit 124 to form the auxiliary acoustic output 236. Supervising audio device 102 may also coordinate the generation of secondary acoustic output 216 and auxiliary acoustic output 236 through another technique associated with another embodiment of the invention, as described in greater detail below.

Supervising audio device 102 may also be paired with multiple different auxiliary audio devices, including auxiliary audio device 122, and may include a matrix of preconfigured auxiliary device profiles for each pairing of supervising audio device 102 with a given auxiliary audio device. When pairing with a particular auxiliary audio device, supervising audio device 102 may query the matrix of preconfigured auxiliary device profiles and retrieve a secondary device profile for supervising audio device 102 and an auxiliary device profile for the given auxiliary audio devices according to that specific pairing. The manufacturer of supervising audio device 102 may predetermine the various combinations of secondary device profiles and auxiliary device profiles included within the matrix of preconfigured device profiles and pre-program supervising audio device 102 to include that matrix. In one configuration, the memory unit 108 of the audio device 102, which is coupled to the processing unit 104, has information relating to the device specifications of the audio device 102 and/or auxiliary audio device 122 stored therein. The stored information may include the audio device profile, one or more auxiliary device profiles and/or other information that will help facilitate the generation of an improved the sound quality generated by the auxiliary audio device 122 and the supervising audio device 102.

In practice, supervising audio device 102 and auxiliary audio device 122 may be configured to operate in conjunction with one another "out of the box" and may include device profiles that would enable such co-operation. For example, supervising audio device 102 could be configured to include both a primary device profile 114 and a secondary device profile 214 at the time of manufacture, while auxiliary audio device 122 could be configured to include auxiliary audio device profile 234 at the time of manufacture. Upon determining that supervising audio device 102 and auxiliary audio device 122 both reside within boundary 120, supervising audio device 102 could automatically perform a reconfiguration process and begin generating secondary acoustic output 216 based on secondary device profile 214, while auxiliary audio device 122 could automatically perform a reconfiguration process and begin generating auxiliary acoustic output 236 based on auxiliary device profile 234. Additionally, supervising audio device 102 could be preloaded with auxiliary device profile 234 and, upon determining that supervising audio device 102 and auxiliary audio device 122 both reside within boundary 120, modulate audio data 112 based on auxiliary device profile 234 and then cause auxiliary audio device 122 to output that modulated audio data.

With this approach, supervising audio device 102 may be pre-loaded with one or more specific device profiles for use when generating acoustic output cooperatively with auxiliary audio device 122. Likewise, auxiliary audio device 122 may be pre-loaded with another specific device profile for use when generating acoustic output cooperatively with supervising audio device 102. Similar to the other approaches described herein, the preloaded device profiles within supervising audio device 102 and auxiliary audio device 122 would make optimal use of the capabilities associated with each of those two devices. In addition, each of supervising audio device 102 and auxiliary audio device 122 could be preloaded with multiple different device profiles that could be used with multiple different devices. Once supervising audio device 102 has performed the reconfiguration process described above, and auxiliary audio device 122 has also performed an analogous reconfiguration process, supervising audio device 102 may stream audio data 112 to auxiliary audio device 122, or may stream modulated audio data to auxiliary audio device 122 based on auxiliary device profile 234, as mentioned above.

Multiple Auxiliary Computing Devices

By implementing the various approaches described above in conjunction with FIGS. 1-2A, system may be configured to control and/or augment the operational capabilities associated with supervising audio device 102 by coordinating the generation of acoustic output with auxiliary audio device 122. In addition, supervising audio device 102 may enhance the sound quality of music derived from audio data 112 when additional resources, such as auxiliary audio devices 122, are available. Further, when multiple different auxiliary audio devices 122 are available to the supervising audio device 102, the supervising audio device 102 may coordinate the operation of those different devices to generate an improved acoustic output, as described in greater detail below in conjunction with FIG. 2B.

FIG. 2B is a conceptual diagram that illustrates supervising audio device 102, an auxiliary audio device 122 and auxiliary audio device 222 configured to generate acoustic output in conjunction with one another, according to one embodiment of the present disclosure. Auxiliary audio devices 122 and 222 illustrated in FIG. 2B may be substantially similar to auxiliary audio device 122 shown in FIGS. 1-2A, and thus may include similar components. In particular, processing unit 224 may be similar to processing unit 124, I/O device 226 may be similar to I/O devices 126, memory 228 may be similar to memory 128, software application 230 may be similar to software application 130, audio data 332 may be similar to audio data 232, and auxiliary device profiles 334 may be similar to auxiliary device profile 234, which are discussed above. Additionally, auxiliary acoustic outputs 236-0 and 236-1 may be similar to one another or may represent different portions of the same audio data, as discussed below. Additionally, supervising audio device 102 and auxiliary audio devices 122 may all reside within boundary 120 shown in FIG. 2A, omitted here for the sake of clarity. However, the different devices shown in FIG. 2B may be configured to determine that those different devices reside within boundary 120, in a similar fashion as described above on conjunction with FIG. 2A.

As a general matter, auxiliary devices 122 and 222 may be substantially similar devices, however, those devices may occupy different roles relative to supervising audio device 102 and, thus, may be configured accordingly. In FIG. 2B, auxiliary audio device 122 is coupled to supervising audio device 102 via communication link 240 and to auxiliary audio device 222 via communication link 242. In this configuration, auxiliary audio device 122 acts as a "master" audio device and auxiliary audio device 222 acts as a "slave" device. Auxiliary audio device 122 is configured to receive audio data 112 from supervising audio device, store that audio data as audio data 232, generate auxiliary acoustic output 236-0, and then re-stream that audio data to auxiliary audio device 222. Auxiliary audio device 222 is configured to receive that audio data and to store the received data as audio data 332. Then, auxiliary audio device 222 may generate auxiliary acoustic output 236-1 based on the received audio data.

With the approach described herein, multiple auxiliary audio devices 122 may be chained together and coupled to supervising audio device 102. In addition, the various techniques described above in conjunction with FIGS. 1-2A may be applied in order to generate auxiliary device profiles 234 and 334 for auxiliary audio devices 122 and 222, respectively. Portions of those device profiles may be transmitted within audio header data provided in the transmitted audio data. In one embodiment, supervising audio device 102 may configure auxiliary audio devices 122 and 222 with auxiliary device profiles 234 and 334 to generate different portions of stereo audio data. For example, auxiliary audio device 122 could generate acoustic output 236-0 representing left channel audio based on auxiliary device profile 234, while auxiliary audio device 222 could generate acoustic output 236-1 representing right channel audio based on auxiliary device profile 334.

In another embodiment, auxiliary audio device 122 may generate acoustic output 236-0 that represents both left and right channel audio until auxiliary audio device 222 becomes available (e.g., auxiliary audio device 222 is turned on). Then, supervising audio device 102 may reconfigure auxiliary audio devices 122 and 222 to each generate audio associated with a different channel.

Supervising audio device 102 and auxiliary audio devices 122 and 222 may communicate via communication links 240, 242, and 244. Communication link 240 may be a Bluetooth® communication link, as previously discussed, and data traffic may be transported across communication link 240 according to any Bluetooth® communication protocol. Communication links 242 and 244 may also be Bluetooth® communication links, and data traffic may be transported across communication links 242 and 244 according to any Bluetooth® communication protocol. Supervising audio device 102 is configured to stream music and transmit commands to auxiliary audio device 122 across communication link 240, and auxiliary audio device 122 is configured to stream music and transmit commands to auxiliary audio device 222 across communication link 242, in similar fashion as mentioned above. Music may be streamed across communication links 240 and 242 according to the advanced audio distribution (A2DP) protocol, while commands may be transmitted according to another Bluetooth® protocol, such as radio frequency communications (RFCOMM) protocol or AVRCP, a protocol associated with controlling volume. During startup, the supervising audio device 102 may perform a pairing procedure in order to establish the communication links 240 and 244 with auxiliary audio devices 122 and 222. The auxiliary audio devices 122 and 222 may also or separately perform a pairing procedure in order to establish a communication link 242 between the auxiliary audio devices 122 and 222.

In some configurations, the auxiliary audio devices 122 and 222 are configured to transmit various control and device settings between themselves to assure that the delivered acoustic outputs 236-0 and 236-1, respectively, are in synch from a temporal, sound quality, sound level, etc. perspective. In one example, if a user adjusts the volume level on the auxiliary audio device 122, by pressing the volume adjustment buttons on the device, the processing unit 124 will cause a command to be sent to the auxiliary audio device 222 via the communication link 242 to adjust the auxiliary audio device 222's volume level accordingly. In another example, if a user adjusts the balance control level on the auxiliary audio device 122, by pressing the one or more buttons on one of the auxiliary audio devices, or a button on the GUI of the supervising audio device 102, a command is sent to the auxiliary audio device 222 via the communication link 242, or communication link 244, to adjust the auxiliary audio device 222's balance relative to the auxiliary audio device 122. After the auxiliary audio devices 122 and 222 complete the initial pairing process, the "master" auxiliary audio device may automatically transmit various control and device settings to the "slave" auxiliary audio device so that the acoustic outputs of these devices are in synch.

After the communication link 242 has been established between the auxiliary audio devices 122 and 222, pairing information and other communication related information may be saved within each device's memory so that when the devices are powered off and then powered back on again the devices' processing units can use this stored information to automatically form the communication link 242 and then transfer any desirable control settings, device settings and/or desired audio data between the linked devices. After the communication link 242 has been established between the auxiliary audio devices 122 and 222, either automatically, or when some physical action (e.g., physically tapping on the device 122) is sensed by a sensor (e.g., accelerometer) in the I/O device (e.g., device 126) within the device, a transfer of any desirable control settings, device settings and/or audio data may be performed.

In some embodiments, a factory loaded audio greeting and/or a user defined customized audio greeting may also be stored within memory 128 and/or 228 so that either of these greetings can be delivered as acoustic outputs 236-0 and 236-1 when the auxiliary audio devices 122 and 222 are powered-on. In some cases, the greeting information stored in one auxiliary audio device, such as auxiliary audio device 122, may be automatically transferred to another auxiliary audio device, such as auxiliary audio device 222, via a newly formed or reestablished communication link 242 so that the desired greeting can be simultaneously delivered as acoustic outputs 236-0 and 236-1 from the auxiliary audio devices 122 and 222, respectively.

Figure 2D:
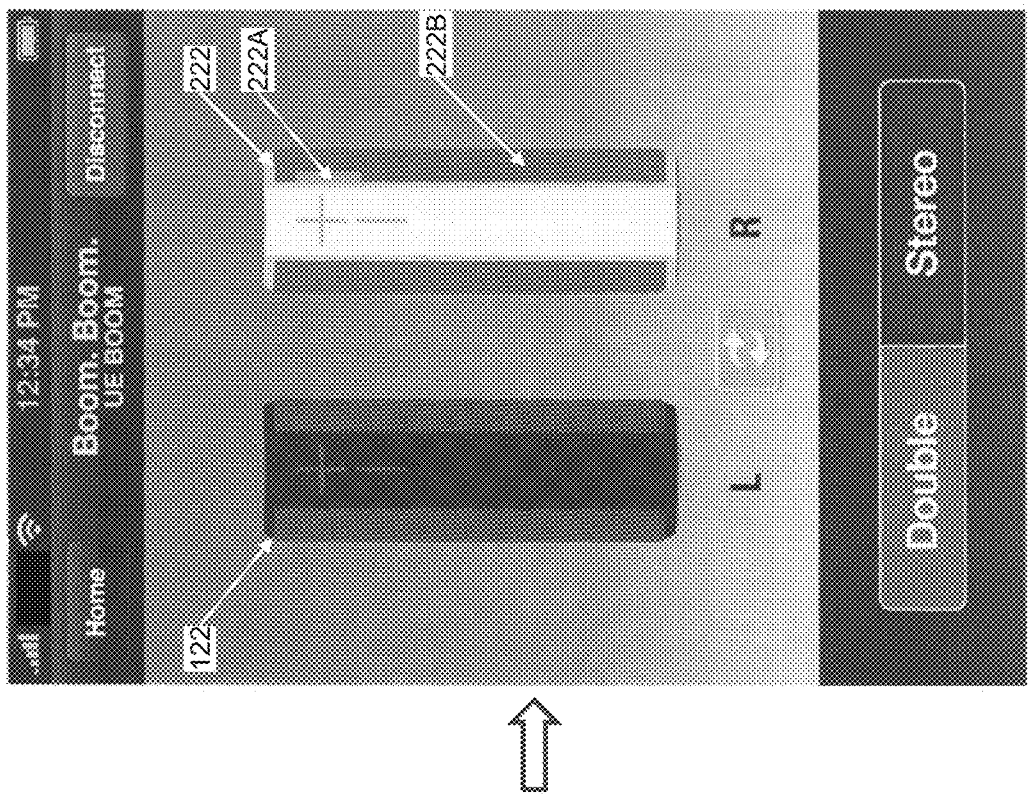
FIGS. 2C-2D illustrate images that are generated on a graphical user interface coupled to a supervising audio device at two different times, according to one embodiment of the present disclosure.
Figure 2C:
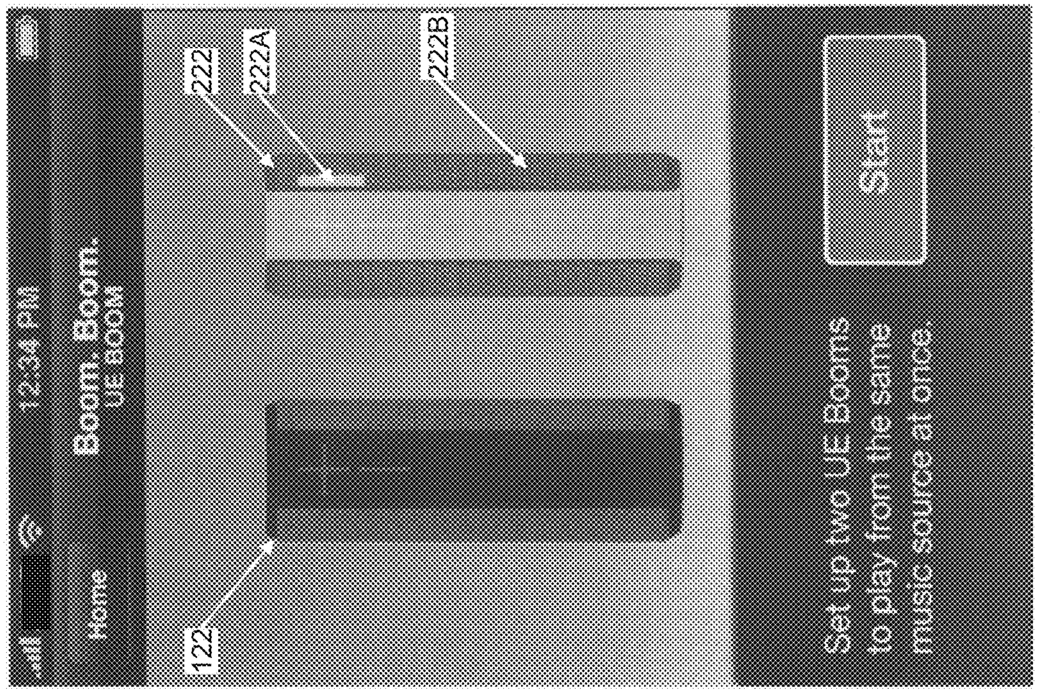

Auxiliary audio devices 122 may also be configured to provide device specifications, such as a "service record," to supervising audio device 102 that includes information specifying one or more colors associated with each such auxiliary audio device. For example, auxiliary audio device 122 could advertise to supervising audio device 102 that auxiliary audio device 122 has a red shell with green and blue stripes. Supervising audio device 102 may use this information to present a picture of the auxiliary audio device 122, with that specific color scheme, to the user. A graphical user interface (GUI) that the supervising audio device 102 may implement for this purpose is illustrated in FIGS. 2C and 2D, and is described in greater detail below. FIG. 2C illustrates a displayed representation of the auxiliary audio devices 122 and 222 found on the GUI of the supervising audio device 102 before the device specification information regarding the auxiliary audio device 222 is sent and/or is processed by the processing unit 104. As illustrated in FIG. 2C, the auxiliary audio device 222 may be originally depicted in as having default attributes, such as a grey speaker color, grey tag color (e.g., reference numeral 222A), a type of grill pattern 222B and a microphone (not shown) or other desirable visual feature of the auxiliary audio device 222. FIG. 2D illustrates a displayed representation of the auxiliary audio devices 122 and 222 found on the GUI of the supervising audio device 102 after the device specification information regarding the auxiliary audio device 222 is processed by the processing unit 104. As illustrated in FIG. 2D, the auxiliary audio device 222's attributes have been adjusted based on the received device specifications, such as, for example, the previously grey speaker and tag colors have been altered on the GUI to match the actual color of the auxiliary audio device 222. Auxiliary audio devices 122 may also report other information back to supervising audio device 102, including a firmware version, and so forth, as discussed above.

Figure 2E:
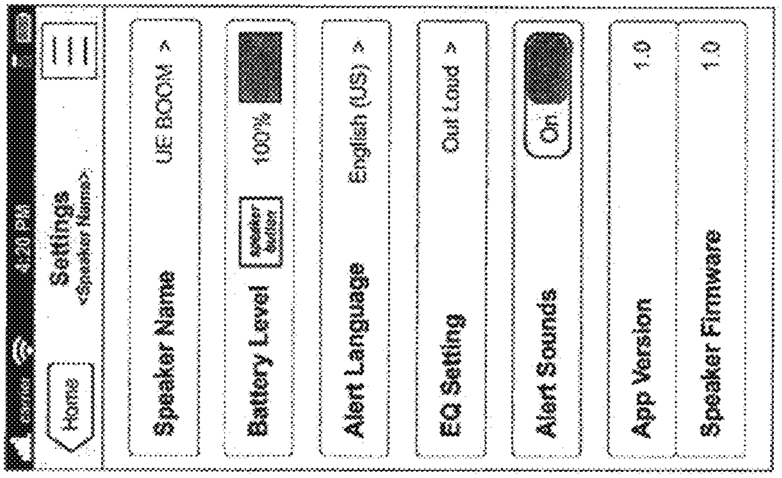
FIGS. 2E-2G each illustrate a graphical user interface created on a supervising audio device that can be used to control the supervising audio device and an auxiliary audio device, according to one embodiment of the present disclosure.

As mentioned above, supervising audio device 102 may expose a GUI to the user that allows that user to interact with auxiliary audio devices 122 and 222. In particular, the GUI allows the user to manage the overall configuration of supervising audio device 102 and auxiliary audio devices 122 and 222, as well as the individual settings associated with each different auxiliary audio device 122 and 222. Software application 110 may generate the GUI displayed on the supervising audio device 102. In one embodiment, software application 110 may represent an iPhone® application executing within iPhone operating system (iOS). In another embodiment, software application 110 may represent an Android® application executing within the Android® operating system. FIG. 2E is an example of a GUI interface that can be used to manage the overall configuration of supervising audio device 102 and auxiliary audio devices 122 and 222. In this example, the user may be able to adjust the sound level, the language delivered to the user at the GUI or provided in an acoustic output, the speaker name, EQ settings, as well as provide the user with useful information, such as the battery level and software version. In some embodiments, the software application 110 may be in communication with the internet via the I/O device 106, such that any firmware updates provided by the manufacturer of the auxiliary devices can be downloaded and then transferred and installed within the auxiliary audio device(s) 122 and/or 222.

Software application 110 is configured to determine which auxiliary audio device is the master device and which is the slave device, and also to coordinate the interoperation of those devices when either device enters boundary 120. Software application 110 may modulate the volume settings of auxiliary audio devices 122 or change the equalization settings of those devices, among other configurable settings, based on the particular auxiliary audio devices 122 and 222 that are currently available. For example, if auxiliary audio device 222 were to be turned off, software application 110 could increase the volume settings of auxiliary audio device 122 and/or update the auxiliary device profile 234 to reflect different equalization settings. Then, if auxiliary audio device 222 were to be turned back on, software application 110 could readjust those different settings accordingly.

Software application 110 may also be configured to query auxiliary audio devices 122 and 222 for a battery level, and to then report that battery level to the user. In one example, the battery level is reported to the user through an icon displayed in the GUI. In some embodiments, the software application 110 is configured to receive the battery level report and cause a battery level notification (e.g., "battery level less than 10%") to be delivered in the acoustic output 236-0 and/or acoustic output 236-1. In some embodiments, the battery level warning is played in combination with other audio information being delivered in the acoustic output 236-0 and/or acoustic output 236-1.

Figure 2F:
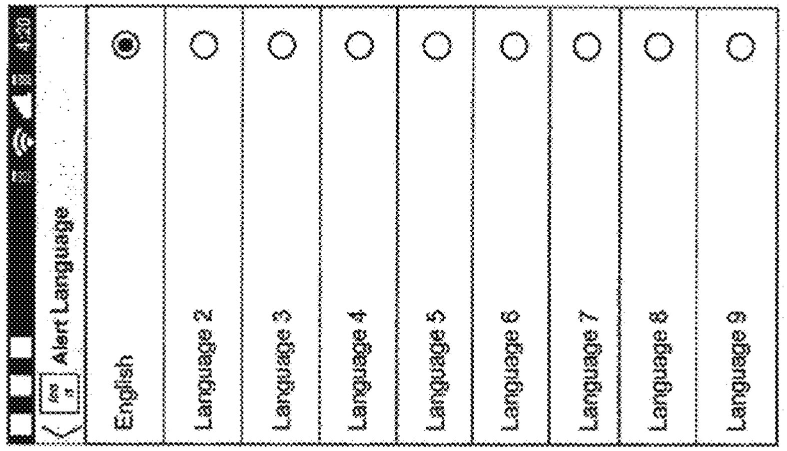
Figure 2G:
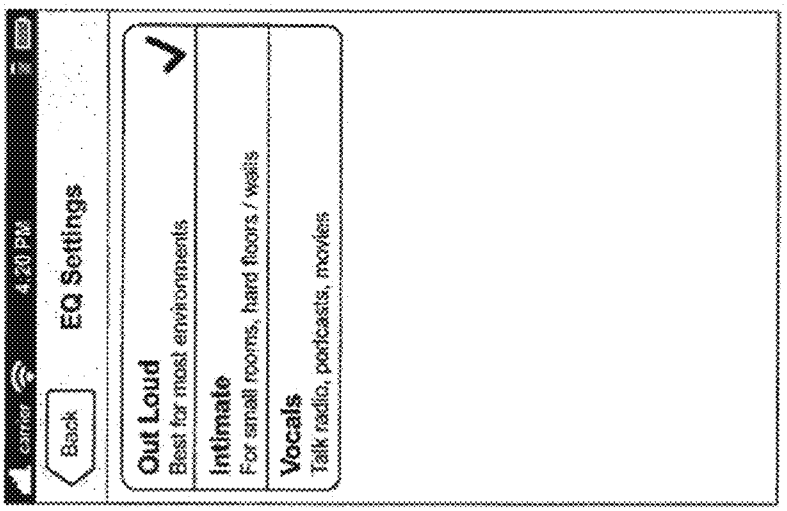

Software application 110 may also detect a language settings associated with a given auxiliary audio device 122 and may change that language setting to match the language setting associated with supervising audio device 102. Software application 110 may also expose controls that allow any such setting associated with auxiliary audio device 122 and 222 or with supervising audio device 102 to be directly controlled by the user. For example, the user could set the volume levels of auxiliary audio devices 122 and 222 to have different values. As a general matter, software application 110 may interact with the master auxiliary audio device 122, which, in turn, interacts with the slave auxiliary audio device 222. FIGS. 2F and 2G are each examples of a GUI interface that can be used to manage the various settings of the supervising audio device 102 and auxiliary audio devices 122 and 222. In one example, the GUI can be used to select a desired language (FIG. 2F) conveyed to the user by the software application 110 or provided to the user as an acoustic output (e.g., greeting or notice prompt). In another example, the GUI can be used to select a desired EQ setting (FIG. 2G), such as a factory provided EQ setting or user customized EQ setting that is used to provide a desired acoustic output.

In some embodiments, the software application 110 allows the user to seamlessly switch the type of acoustic output provided by one or both of the auxiliary audio devices 122 and 222 when the user simply provides input to the user interface of the supervising audio device 102. In one example, the user may provide input to the supervising audio device 102 which causes the software application 110 to send channel control information, that is used to switch the type of audio output being separately generated by the auxiliary audio device 122 and auxiliary audio device 222, such as swapping the left channel and right channel audio output between auxiliary audio devices. This operation may be performed by the software application 110 adding the channel control information to data that is being transferred to the master audio device (e.g., auxiliary audio device 122) from the supervising audio device 102. The master audio device then receives and processes the command and then causes the acoustic output 236-0 of the master audio device and acoustic output 236-1 on the auxiliary audio device 122 to change. In one configuration, the channel control information is delivered on a separate communication channel from the main communication channel (e.g., Bluetooth® communication channel).

In some embodiments, multiple supervising audio devices 102 are able to communicate with one or more of the auxiliary audio devices 122, 222 via separately formed communication links 240. In this configuration, the software application 110 in each of the supervising audio devices 102 may be configured to separately provide audio data (e.g., MP3 songs) to the one or more of the connected auxiliary audio devices. The separately provided audio data may be stored within the memory of the one or more connected auxiliary audio devices, so that the received audio data can be played as an acoustic output by the auxiliary audio device(s) in some desirable order, such as in the order received (e.g., FIFO). This technique, which is known as a "party mode" of operation, allows multiple users to separately deliver audio content to the same auxiliary audio device(s), so that the delivered audio content can be brought together to form a playlist that can be played in a desirable order by the auxiliary audio device(s).

In some embodiments, the supervising audio device 102 and/or auxiliary audio device 122 may utilize identification information relating to the auxiliary audio device 222 to adjust and control the acoustic outputs 236-0 and 236-1. The identification information may include data relating to physical characteristics of the auxiliary audio device 222, and may be stored in memory unit 108 or 128, or retrieved from the auxiliary audio device 222 through communications link 242. The identification information may be pre-programmed and/or stored in memory based on vendor specifications or may be learned and then stored in memory 108 or 128.

In applications in which the master audio device (e.g., auxiliary audio device 122) is used to re-stream information to the slave audio device (e.g., auxiliary audio device 222) it may be desirable to buffer some of the received audio data 112 in memory 128. In one embodiment, the auxiliary audio devices 122 and 222 are each configured to deliver a tone that is received by microphone in the supervising audio device 102 to determine the latency of the acoustic output to assure the acoustic output 236-0 and acoustic output 236-1 are in synch. In another embodiment, the auxiliary audio device 222 is configured to deliver a tone that is received by microphone in the auxiliary audio devices 122 or supervising audio device 102 to determine the latency of the acoustic output acoustic output 236-1 relative to the acoustic output 236-0. In either case, the software application(s), for example software applications 110 or 230, can adjust the acoustic outputs 236-0 and 236-1 so that the audio outputs are in synch. In some re-streaming configurations, synchronization of the acoustic outputs 236-0 and 236-1 requires buffering of the audio data in the memory of the auxiliary audio device 122 to account for any latency in the audio data transfer to the auxiliary audio device 222 and/or time required to deliver the audio output to the speaker(s) in the auxiliary audio devices 222.

However, in some configurations, it may be desirable to deliver the audio data 112 to each of the auxiliary audio devices 122, and 222 from the supervising audio device 102 separately via the communication links 240 and 244, respectively. In this cases, the supervising audio device 102 is in direct communication with both auxiliary audio devices 122 and 222, and is able to deliver the desired content to both auxiliary audio devices.

In some embodiments, the supervising audio device 102 may acquire device specifications from auxiliary audio device 122 and 222 that reflect the operational capabilities associated with audio devices 122 and 222. The device specifications associated with auxiliary audio device 122 or 222 could represent, for example, firmware type information of the auxiliary audio devices 122 and/or 222, physical attributes of the auxiliary audio devices 122 and/or 222 (e.g., speaker color scheme, tag color, skin color, microphone is present), equalizer settings for the auxiliary audio devices 122 and/or 222 (e.g., vocal focused equalizer setting, outdoors equalizer setting, bass-reduced equalizer setting, bass rich equalizer setting), audio settings for the auxiliary audio devices 122 and/or 222 (e.g., volume level, volume range), vocalized notifications language settings for the auxiliary audio devices 122 and/or 222 (e.g., English, Japanese, etc.), model number of the auxiliary audio devices 122 and/or 222, streaming status of the auxiliary audio devices 122 and/or 222 (e.g., auxiliary audio device 122 is connected with of the auxiliary audio devices 222), battery level information of the auxiliary audio devices 122 and/or 222, dynamic range information of the auxiliary audio devices 122 and/or 222, power output information for the auxiliary audio devices 122 and/or 222 or position of speakers, among others. In one embodiment, the device specifications may indicate a device identifier associated with auxiliary audio device 122 and 222, and supervising audio device 102 may be configured to retrieve additional device information associated with auxiliary audio device 122 or 222 using that device identifier (e.g., via a cloud-based service). In one embodiment, the supervising audio device 102 is configured to analyze the received device specifications and to then cause the auxiliary audio devices 122 and 222 to generate the acoustic outputs 236-0 and 236-1 in conjunction with one another. In another embodiment, the supervising audio device 102 is configured to analyze the received device specifications and to then cause supervising audio device 102 and auxiliary audio devices 122 and 222 to generate secondary acoustic output 216, acoustic output 236-0 and acoustic output 236-1 in conjunction with one another. In yet another embodiment, the processing components in the supervising audio device 102, and/or the auxiliary audio devices 122, are configured to analyze the received device specifications for the auxiliary audio device 222 and to then adjust the content of the audio data that is to be transferred to the auxiliary audio devices 222 via one of the communication links 242 or 244. The adjustments made by the supervising audio device 102 and/or the auxiliary audio devices 122 to the audio data may, for example, be based on the operational capabilities of the auxiliary audio devices 222 or based on the user settings that control some aspect of the acoustic outputs, such as adjust the audio quality and/or audio content delivered from the auxiliary audio devices 122 and 222.

In one embodiment, the GUI on supervising audio device 102 includes a graphical representation of each of the types of auxiliary audio devices 122 and 222. At the initiation of the communication between the auxiliary audio device 122 and auxiliary audio device 222 the actual physical representation in the GUI can be adjusted by the software application 110 to account for the physical characteristics of each of the auxiliary audio devices 122 and 222. In one configuration, due to the receipt of the acquired device specifications by the supervising audio device 102, the name (e.g., associated text) and/or physical representation of the auxiliary audio device 122 and auxiliary audio device 222 is adjusted to account for the correct physical shape and/or color scheme (e.g., overall color, individual component's color, speaker cover texture, etc.). In one example, the GUI is configured to change the physical representation of the auxiliary audio device(s) from a default setting (e.g., grey color scheme) to the actual color of the auxiliary audio device (e.g., red color scheme). In some embodiments, the supervising audio device 102 is further configured to download audio information from the internet, such as sounds or vocal alerts, and store this information within one or more of the memory locations (e.g., memory 108, 128 and/or 228). The stored sounds and vocal alerts may then be customized by the user using software elements found in the software application 110, so that these custom elements can be delivered as an acoustic output from one or more of the auxiliary devices 122, 222.

In one embodiment, supervising audio device 102 and auxiliary audio device 122 are configured to generate secondary acoustic output 216 and auxiliary acoustic output 236-0, respectively, while auxiliary audio device 122 establishes communication link 242. In doing so, auxiliary audio device 122 may enter a discoverable mode, while auxiliary audio device 222 enters inquiry mode. While in inquiry mode a device (e.g., auxiliary audio device 222) can send and receive information to aid in the pairing process and the device that is in discoverable mode (e.g., auxiliary audio device 122) is configured to send and receive the pairing information from the other device. In cases where the auxiliary audio device 122 enters the discoverable mode while it is providing an audio output 236-0, the device's ability to continuously deliver the audio output 236-0 will not be affected. During startup, the supervising audio device 122 may initiate and perform a pairing procedure with another auxiliary audio device 222 when some physical action (e.g., physically tapping surface of the device, shaking the device, moving the device, etc.) is sensed by a sensor (e.g., accelerometer) in the I/O device 126 of the auxiliary audio device 122, or by bringing an auxiliary audio device in close proximity to another auxiliary audio device (e.g., presence sensed by NFC linking hardware) or by some other user-initiated action sensed by the I/O device 126. The auxiliary audio devices 122 and 222 may separately perform a pairing procedure in order to establish communication link 242 between the auxiliary audio devices 122 and 222.

In another embodiment, if both auxiliary audio devices 122 and 222 are coupled to supervising audio device 102 (or in communication with software application 110), pressing a button or button combination (e.g., "+" icon button) disposed on the surface of the device causes the corresponding device to enter the discoverable mode, and pressing a button or button combination on the other device causes the other device to enter inquiry mode. Alternately, the inquiry and discovery modes may be initiated by some physical action performed on the devices, which is sensed by accelerometers in the device, or by bringing them in close proximity to each other or by some other user-initiated action sensed by the devices. Alternately, the user may interact with the GUI on supervising audio device 102 to instruct supervising audio device 102 to send instructions to both auxiliary audio devices 122 and 222 to go into inquiry and discovery modes, respectively. Consequently, both auxiliary audio devices 122 and 222 may then pair and re-stream without the need to push buttons on both such devices.

In yet another embodiment, the user of the devices described herein may dynamically set the user EQ to a specific setting; e.g. vocal or bass-reduced or bass-enhanced while acoustic output is being generated or not being generated. If the devices are in the restreaming mode, that EQ setting can be sent from auxiliary audio device 122 to auxiliary audio device 222 within the transmitted audio packet headers, so that auxiliary audio devices 122 and 222 will have the same EQ setting.

In yet another embodiment, color information may be exchanged between auxiliary audio devices 122 and 222 and supervising audio device 102, as mentioned above and as described in greater detail herein. An auxiliary audio device (122 or 222) may write the color info to a persistent storage (non-volatile memory) during the manufacturing process, retrieve the color information and encode that information in a Bluetooth SDP record, which is typically performed during a pairing process. Auxiliary audio device 122 may retrieve the color information of auxiliary audio device 222 from the SDP record exchanged during the re-streaming link pairing and connect set-up process.

Device Communication and Control Examples

Figure 3:
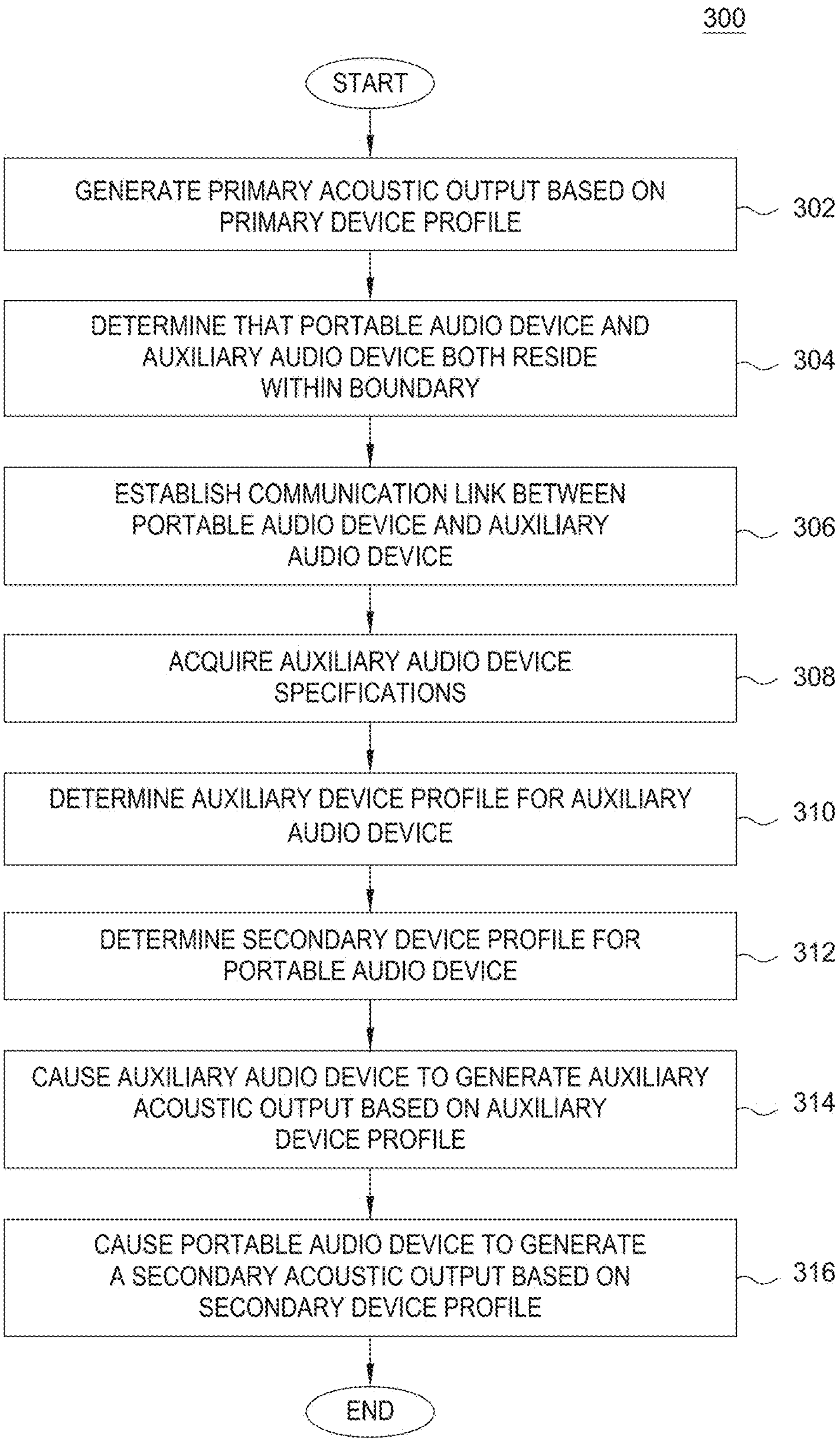
FIG. 3 is a flow diagram of method steps for causing the supervising audio device and auxiliary audio devices shown in FIG. 2B to operate in conjunction with one another, according to one embodiment of the present disclosure.

FIG. 3 is a flow diagram of method steps for causing supervising audio device 102 to operate in conjunction with an auxiliary audio device 122 and an auxiliary audio device 222, according to one embodiment of the invention. Although the method steps are described in conjunction with the systems of FIG. 2B, persons skilled in the art will understand that any system configured to perform the method steps, in any order, is within the scope of the present invention.

As shown, a method 300 begins at step 302, where supervising audio device 102 delivers audio data 112 and the auxiliary audio device 122 generates a primary acoustic output based on the secondary device profile 214. Secondary device profile 214 may reflect various settings and/or parameters associated with the acoustic output of auxiliary audio device 122. For example, secondary device profile 214 could include equalization settings, volume settings, sound modulation settings, a low-frequency cutoff parameter, a crossover cutoff parameter, and so forth, as discussed above.

At step 304, supervising audio device 102 determines that supervising audio device 102 and auxiliary audio devices 122 and 222 all reside within boundary 120. Supervising audio device 102 may determine that supervising audio device 102 and auxiliary audio devices 122 and 222 all reside within boundary 120 by implementing a wide variety of techniques, including computing an RSSI metric for signals received from auxiliary audio devices 122 and/or 222, physically contacting auxiliary audio devices 122 and 222, or receiving user input indicating that supervising audio device 102 and auxiliary audio devices 122 and 222 all reside within boundary 120. This determination may be based on user input indicating whether supervising audio device 102 and auxiliary audio devices 122 and 222 all reside within boundary 120, among other things.

At step 306, supervising audio device 102 establishes communication link 240 with auxiliary audio device 122 and a communication link 244 with the auxiliary audio device 222. Communication links 240 and 244 may be any technically feasible type of communication link that allows supervising audio device 102 and auxiliary audio devices 122 and/or 222 to exchange data with one another. For example, communication link 240 or 244 could be a wireless link, such as a WiFi link or a Bluetooth® link, or a wired, physical data link or analog link. Supervising audio device 102 may also perform a pairing procedure in order to establish communication link 240 and 244 with auxiliary audio devices 122 and 222.

At step 308, supervising audio device 102 acquires device specifications associated with auxiliary audio device 122 and/or 222 that reflect the operational capabilities associated with auxiliary audio devices 122 and 222. The device specifications associated with auxiliary audio device 122 and 222 could represent, for example, a dynamic range, a power output, a number of speakers, a position of speakers, a battery level, a volume range, or a default equalization setting of auxiliary audio device 122 and/or 222, among others. In one embodiment, the device specifications may indicate a device identifier associated with auxiliary audio devices 122 and 222, and supervising audio device 102 may be configured to retrieve additional device information associated with auxiliary audio device 122 and 222 using that device identifier (e.g., via a cloud-based service).

In practice, supervising audio device 102 and auxiliary audio devices 122 and 222 may also be configured to operate in conjunction with one another "out of the box" and may be preloaded with device profiles that would enable such cooperation. With this approach, supervising audio device 102 may not need to acquire device specifications associated with auxiliary audio device 122 and 222 at step 308. Supervising audio device 102 may be preloaded to include such information at the time of manufacture, and upon performing step 306 discussed above, may simply stream audio data 112 to auxiliary audio device 122 that is modulated to cause that audio device to generate auxiliary acoustic output 236-0. In one embodiment, the auxiliary audio device 122 then re-streams the audio data 112 to the auxiliary audio device 222 via the communication link 242 to cause that auxiliary audio device 222 to generate auxiliary acoustic output 236-1. Alternatively, supervising audio device 102 could, upon performing step 306, transmit an auxiliary device profile 234, which is preloaded in memory within supervising audio device 102, to auxiliary audio device 122. Supervising audio device 102 could then retrieve a corresponding device profile in order to reconfigure supervising audio device 102 (i.e. secondary device profile 214), then proceed directly to step 314.

At step 310, supervising audio device 102 determines the auxiliary device profile 234 for auxiliary audio device 122 and/or the auxiliary device profile 334 for auxiliary audio device 222. Auxiliary device profiles 234 and 334 may reflect various settings and/or parameters associated with acoustic output 236-0 and 236-1 of auxiliary audio device 122, 222, respectively, such as equalization settings, volume settings, sound modulation settings, and the like. In one embodiment of step 310, the supervising audio device 102 transfers the auxiliary device profile 234 to the auxiliary audio device 122 via the communication link 240 and the auxiliary audio device 122 then re-streams the auxiliary device profile 234 to the auxiliary audio device 222 via the communication link 242.

At step 312, optionally the supervising audio device 102 determines secondary device profile 208 for supervising audio device 102 that reflect various settings and/or parameters associated with acoustic output 216 of supervising audio device 102.

At step 314, supervising audio device 102 causes auxiliary audio device 122 to generate auxiliary acoustic output 236-0 based on auxiliary device profile 234. Software application 130 within memory unit 128, when executed by processing unit 124 within auxiliary audio device 122, may configure auxiliary audio device 122 based on the settings and/or parameters included within the generated auxiliary device profile 234 formed in step 310. The auxiliary audio device 122 may then cause the auxiliary audio device 222 to be configured for re-streaming from the auxiliary audio device 122. Auxiliary audio device 122 may then generate secondary acoustic output 236-0 based on the configuration found in the auxiliary device profile 234, and the auxiliary audio device 122 then re-streams the audio data 112 so that the auxiliary audio device 222 can generate the acoustic output 236-1.

At step 316, optionally the supervising audio device 102 generates secondary acoustic output 216 based on secondary device profile 214. Software application 110 within memory unit 108, when executed by processing unit 104 within supervising audio device 102, may configure supervising audio device 102 based on the settings and/or parameters included within secondary device profile 214. Supervising audio device 102 may then generate secondary acoustic output 216 based on the configuration of found in the secondary device profile 214. In this example, the secondary acoustic output 216 is different than the original primary acoustic output 116 (e.g., nominal acoustic output) that would have been delivered by the supervising audio device 102 if the method 300 was not performed. Supervising audio device 102 may also terminate generation of acoustic output 116 when performing step 316. The method then ends.

By implementing the method 300, supervising audio device 102 is configured to rely on auxiliary audio devices 122 and 222 for the generation and output of the associated with audio data 112, thereby providing a richer user experience.

The supervising audio device 102 may also return to nominal operation and resume the generation of primary acoustic output 116 when supervising audio device 102 and auxiliary audio devices 122 and/or 222 no longer both reside within boundary 120.

Figure 4:
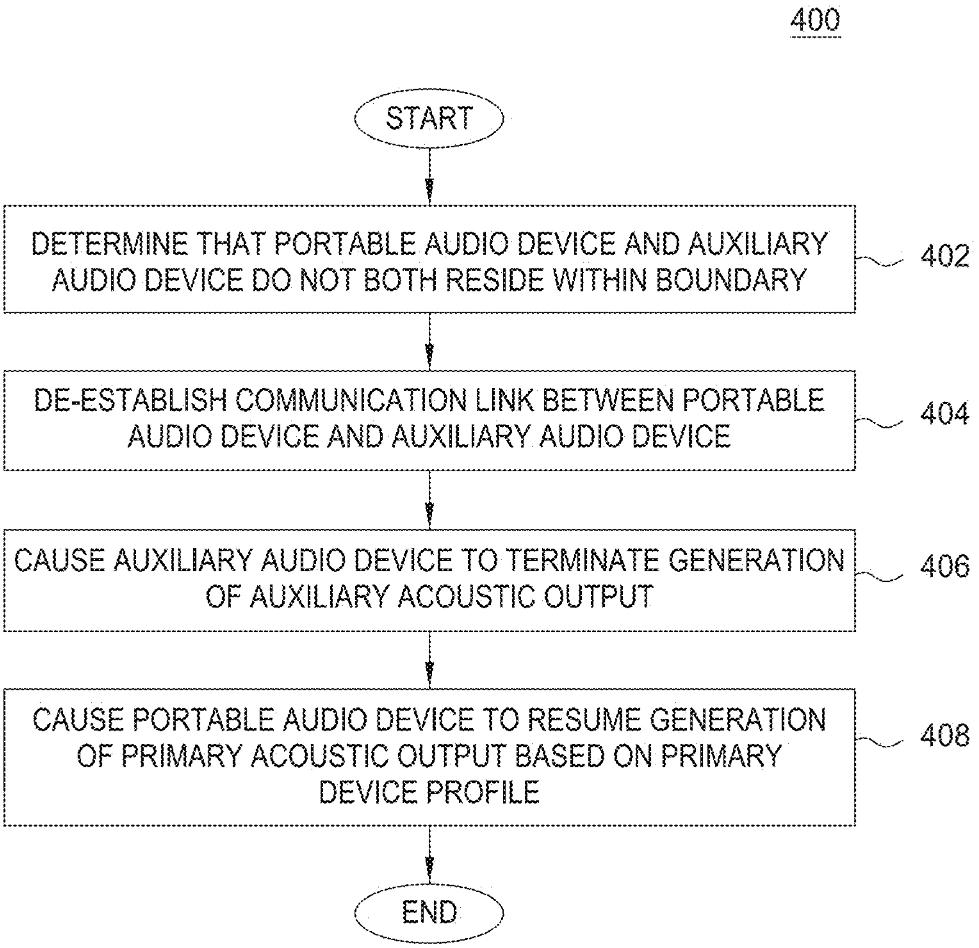
FIG. 4 is a flow diagram of method steps for causing the supervising audio device and the auxiliary audio devices shown in FIG. 2B to stop operating in conjunction with one another, according to one embodiment of the present disclosure.

FIG. 4 is a flow diagram of method steps for causing supervising audio device 102 and auxiliary audio devices 122 and 222 to stop operating in conjunction with one another, according to one embodiment of the invention. Although the method steps are described in conjunction with the systems of FIG. 2B, persons skilled in the art will understand that any system configured to perform the method steps, in any order, is within the scope of the present invention.

As shown, a method 400 begins at step 402, where supervising audio device 102 determines that supervising audio device 102 and auxiliary audio devices 122 and 222 no longer reside within boundary 120. Supervising audio device 102 may perform step 402 by computing an RSSI metric for signals periodically received from auxiliary audio device 122 and 222, and determining that the computed RSSI metric falls below an expected RSSI metric. In one embodiment, step 402 may also be performed manually or semi-automatically, thus relying on some amount of user intervention.

At step 404, supervising audio device 102 de-establishes communication link 240, 242 and/or 244 with auxiliary audio devices 122 and 222. Supervising audio device 102 could, for example, terminate pairing between supervising audio device 102 and auxiliary audio devices 122 and 222. At step 406, supervising audio device 102 causes auxiliary audio device 122 and 222 to terminate the generation of auxiliary acoustic output 236-0 and 236-1.

At step 408, the supervising audio device 102 resumes generation of primary acoustic output 116 based on primary device profile 114. Supervising audio device 102 may also terminate generation of secondary acoustic output 216 when performing step 408. The method 400 then ends.

By implementing the method 400, in conjunction with implementing the method 300, supervising audio device 102 may seamlessly initiate and terminate the cooperative generation of acoustic output with auxiliary audio devices 122 and 222. Accordingly, supervising audio device 102 is provided with extended battery life as a result of relying on auxiliary audio device 122 and 222 for the generation of power-consuming frequencies, while simultaneously providing the user of supervising audio device 102 with an enhanced acoustic experience.

Persons skilled in the art will recognize that any of the aforementioned techniques may be implemented by either supervising audio device 102 or auxiliary audio device 122, 222, or supervising audio device 102 and auxiliary audio device 122, 222 operating in conjunction with one another. For example, auxiliary audio device 122 may be configured to determine whether auxiliary audio device 122 and supervising audio device 102 both reside within boundary 120 or both no longer reside within boundary 120. In various other embodiments, auxiliary device 122 and/or 222 may implement the steps found in method 300 and/or the method 400 relative to supervising audio device 102, and thus the roles of each device in these methods are reversed.

In sum, a supervising audio device is configured to generate acoustic output in conjunction with auxiliary audio devices when the supervising audio device and the auxiliary audio devices all reside within a given boundary. When the supervising audio device connects with the auxiliary audio devices, the supervising audio device determines optimized device settings and/or parameters for the auxiliary audio devices based on the desired settings and/or differences between the operational capabilities of the auxiliary audio devices.

Advantageously, the supervising audio device may provide a richer acoustic experience for the user by augmenting or extending the acoustic output of the supervising audio device via the additional operational capabilities of the auxiliary audio devices. In addition, the supervising audio device may conserve power and extend battery life by reducing the power required to generate frequencies for which the auxiliary audio device may be configured to generate.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Embodiments of the invention may provide a computer-implemented method for generating an acoustic output from an audio device, comprising: forming a communication link between a first audio device and a second audio device; retrieving device specifications associated with the second audio device; displaying at least one physical attribute of the second audio device on an image displaying device coupled to the first audio device; transferring audio data to the second audio device from the first audio device; and generating a second acoustic output from the second audio device based on the transferred audio data.

Embodiments of the invention may provide a computer-implemented method for generating an acoustic output from an audio device, comprising forming a communication link between a first audio device and a second audio device; forming a communication link between the first audio device and a third audio device; retrieving device specifications associated with the second and third audio devices; displaying at least one physical attribute of the second audio device and/or the third audio device on an image displaying device coupled to the first audio device; transferring audio data to the second audio device from the first audio device; generating a first acoustic output from the second audio device based on the transferred audio data; and generating a second acoustic output from the third audio device based on the audio data.

Embodiments of the invention may provide a computer-implemented method for generating and acoustic output from an audio device, comprising: forming a communication link between a first audio device and a second audio device; forming a communication link between the first audio device and a third audio device; transferring audio data to the second audio device from the first audio device, wherein the audio data comprises left channel data and right channel data; simultaneously generating a first acoustic output from the second audio device and a second acoustic output from the third audio device, wherein the first acoustic output includes the left channel data and the second acoustic output includes the right channel data, and the first acoustic output and the second acoustic output are different; transmitting a command to the second audio device; and then simultaneously generating a third acoustic output from the second audio device and a fourth acoustic output from the third audio device, wherein the third acoustic output comprises the right channel data and the fourth acoustic output comprises the left channel data, and the third acoustic output and the fourth acoustic output are different.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for generating an acoustic output from an audio device, comprising:

receiving, at a first audio device, device specifications associated with a second audio device via a first communication link formed between the first audio device and the second audio device;

receiving, at the first audio device, first audio data from a supervising audio device via a second communication link formed between the first audio device and the supervising audio device;

altering, by the first audio device, a first property of the first audio data based on the received device specifications to generate second audio data;

sending the second audio data to the second audio device from the first audio device; and generating a first acoustic output from the first audio device using the first audio data received from the supervising audio device and a second acoustic output from the second audio device using the sent second audio data.

2. The method of claim 1, wherein the first and the second communication links comprises a Wi-Fi link, a Bluetooth® link, near field communication link or a link via a cloud-based service.

3. The method of claim 1, wherein the receiving the device specifications associated with the second audio device further comprises:

retrieving the device specifications associated with the second audio device from memory disposed in the first audio device.

4. The method of claim 3, wherein the retrieving the device specifications associated with the second audio device further comprises:

retrieving the device specifications associated with the second audio device from memory disposed in the second audio device; and sending the device specifications to the first audio device via the first communication link.

5. The method of claim 1, wherein the receiving the device specifications associated with the second audio device further comprises:

retrieving the device specifications associated with the second audio device from memory disposed in the second audio device; and sending the device specifications to the first audio device via the first communication link.

6. The method of claim 1, wherein the device specifications comprise physical attribute information of the second audio device.

7. The method of claim 6, further comprising:

sending the physical attribute information to the supervising audio device via the second communication link; and generating an image of the second audio device on a display coupled to the supervising audio device, wherein the image is derived from the sent physical attribute information.

8. The method of claim 1, wherein the sent second audio data comprises a setting parameter, wherein the setting parameter is selected from the group consisting of a volume setting, an equalizer setting and a balance setting.

9. The method of claim 1, wherein the first communication link is formed by a method comprising:

initiating a pairing process to form the first communication link by performing a physical action on the first or the second audio devices.

10. The method of claim 1, wherein altering the first property of the first audio data to generate the second audio data comprises altering a range of audio frequencies included in the second audio data relative to the first audio data.

11. The method of claim 1, wherein altering the first property of the first audio data to generate the second audio data is based on the received device specifications without receiving an instruction on the supervising audio device to alter the first property of the first audio data.

12. A method for generating an acoustic output from an audio device, comprising:

receiving, at a supervising audio device, first device specifications associated with a first audio device via a first communication link formed between the first audio device and the supervising audio device;

receiving, at the supervising audio device, second device specifications associated with a second audio device via a second communication link formed between the second audio device and the supervising audio device;

sending first audio data to the first audio device from the supervising audio device via the first communication link;

sending second audio data to the second audio device from the supervising audio device via the second communication link, wherein a difference between the first audio data and the second audio data is based on determining there is a first difference in operational capabilities between the first audio device and the second audio device, wherein the first difference is derived from the first device specifications and the second device specifications;

generating a first acoustic output from the first audio device using the first audio data received from the supervising audio device; and generating a second acoustic output from the second audio device using the first audio data received from the supervising audio device.

13. The method of claim 12, wherein the first and the second communication links comprises a Wi-Fi link, a Bluetooth® link, near field communication link or a link via a cloud-based service.

14. The method of claim 12, wherein the receiving the first device specifications associated with the first audio device further comprises:

retrieving device information associated with the first audio device from memory disposed in the supervising audio device, wherein the device information is selected based on information provided in the received first device specifications.

15. The method of claim 12, wherein the receiving the first device specifications associated with the first audio device further comprises:

retrieving the first device specifications associated with the first audio device from memory disposed in the first audio device; and sending the first device specifications to the supervising audio device via the first communication link.

16. The method of claim 12, wherein the sent first audio data comprises a setting parameter, wherein the setting parameter is selected from the group consisting of a volume setting, an equalizer setting and a balance setting.

17. The method of claim 12, wherein the difference between the first audio data and the second audio data is that the first audio data includes a first range of audio frequencies and the second audio data includes a second range of audio frequencies, and first range of audio frequencies is different from the second range of audio frequencies.

18. The method of claim 12, further comprising:

displaying a first physical attribute of a static external visual appearance of the first audio device on a graphical user interface coupled to the supervising audio device based on the received first device specifications, wherein the first physical attribute of the static external visual appearance of the first audio device is different than a corresponding default physical attribute for the first audio device initially displayed on the graphical user interface of the supervising audio device before receiving the first device specifications; and displaying a second physical attribute of a static external visual appearance of the second audio device on the graphical user interface coupled to the supervising audio device based on the received second device specifications, wherein the second physical attribute of the static external visual appearance of the second audio device is different than a corresponding default physical attribute for the second audio device initially displayed on the graphical user interface of the supervising audio device before receiving the second device specifications.

19. An electronic device configured to generate audio output, comprising:

a processor;

a wireless transceiver that is in communication with the processor;

an I/O device structured to provide input to the processor and to receive output signals from the processor, wherein the I/O device comprises a speaker; and a memory having stored therein a number of instructions which, when executed by the processor, causes the electronic device to perform operations comprising:

receiving device specifications associated with a first audio device via a first communication link formed between the electronic device and the first audio device;

receiving first audio data from a supervising audio device via a second communication link formed between the electronic device and the supervising audio device;

altering a first property of the first audio data to generate second audio data based on the received device specifications;

sending the second audio data to the first audio device; and generating a first acoustic output using the first audio data received from the supervising audio device.

20. The electronic device of claim 19, wherein the memory also includes device specifications associated with the electronic device, wherein the device specifications associated with the electronic device are selected based on information provided in the received device specifications.

21. The electronic device of claim 19, wherein altering the first property of the first audio data to generate second audio data comprises altering a range of audio frequencies included in the second audio data relative to the first audio data.

* * * * *